United States Patent
Hou (10) Patent No.: US 6,641,265 B1
(45) Date of Patent: Nov. 4, 2003

(54) EYEGLASSES WITH COUPLING MEMBERS FOR INTERCONNECTING TEMPLES AND LENSES THEREOF

(76) Inventor: Su-Fen Hou, 5F, No. 127-1, Lane 84, Rong-Yi St., Tainan City (TW)

( * ) Notice: Subject to any disclaimer, the term of this patent is extended or adjusted under 35 U.S.C. 154(b) by 0 days.

(21) Appl. No.: 10/395,149

(22) Filed: Mar. 25, 2003

(51) Int. Cl.$^7$ .................................................. G02C 1/02
(52) U.S. Cl. ...................................... 351/110; 351/124
(58) Field of Search .............................. 51/110, 83, 86, 51/103, 106, 41, 140, 124

(56) References Cited

U.S. PATENT DOCUMENTS

| | | | | |
|---|---|---|---|---|
| 5,847,800 A | * | 12/1998 | Tachibana | 351/110 |
| 5,936,701 A | * | 8/1999 | Sartor | 351/110 |
| 6,523,952 B1 | * | 2/2003 | Krumme | 351/110 |
| 6,540,350 B2 | * | 4/2003 | Fujita | 351/110 |

* cited by examiner

*Primary Examiner*—Hung Xuan Dang
(74) *Attorney, Agent, or Firm*—Nixon & Vanderhye P.C.

(57) ABSTRACT

In a pair of eyeglasses, a pair of temples are pivoted respectively to a pair of lenses through a pair of coupling members. Each of the lens has a temple end formed with a recess and a pair of barbs projecting into the recess and toward each other. Each coupling member has an engaging end formed with a pair of engaging tongues that are snugly fitted into the recess in the temple end of the respective lens and that engage respectively the barbs.

3 Claims, 10 Drawing Sheets

EYEGLASSES WITH COUPLING MEMBERS FOR INTERCONNECTING TEMPLES AND LENSES THEREOF

BACKGROUND OF THE INVENTION

1. Field of the Invention

This invention relates to a pair of eyeglasses, more particularly to a pair of eyeglasses with coupling members for interconnecting lenses and temples thereof.

2. Description of the Related Art

Figure 1:
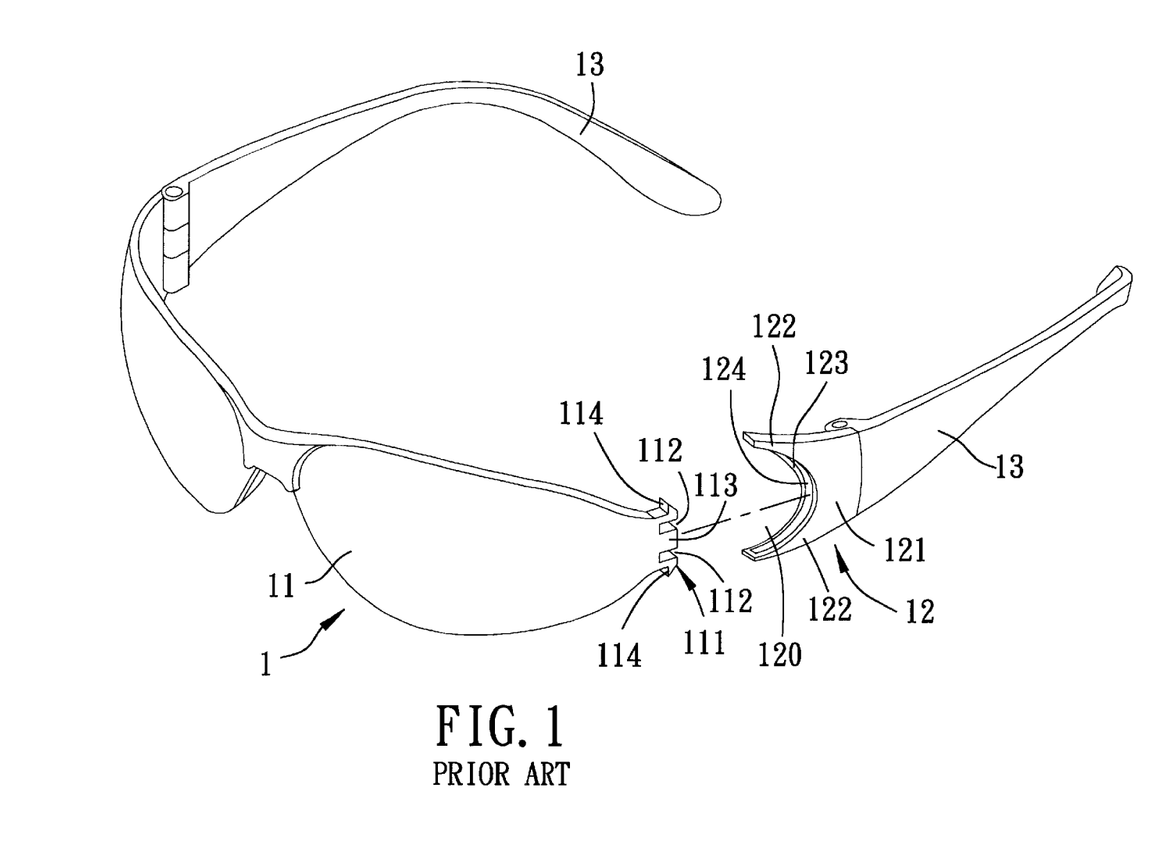
FIG. 1 is a partly exploded perspective view of a conventional pair of eyeglasses.
Figure 2:
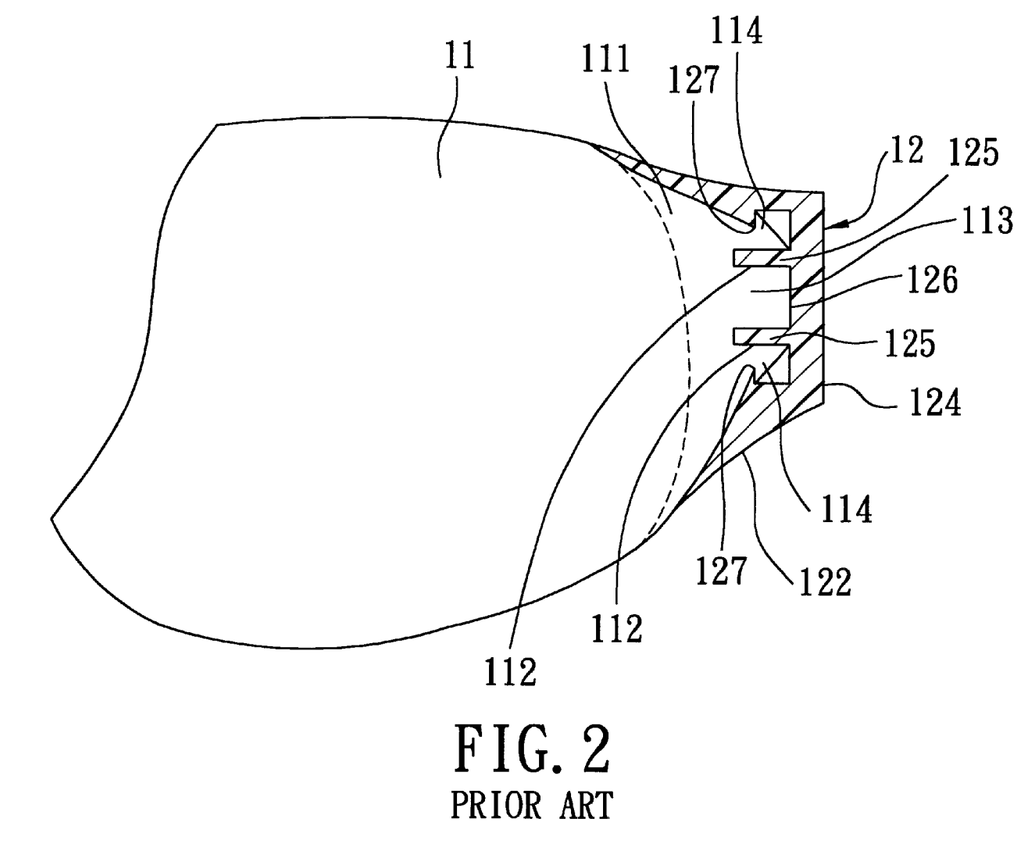
FIG. 2 is a fragmentary sectional view of the eyeglasses of FIG. 1.
Figure 3:
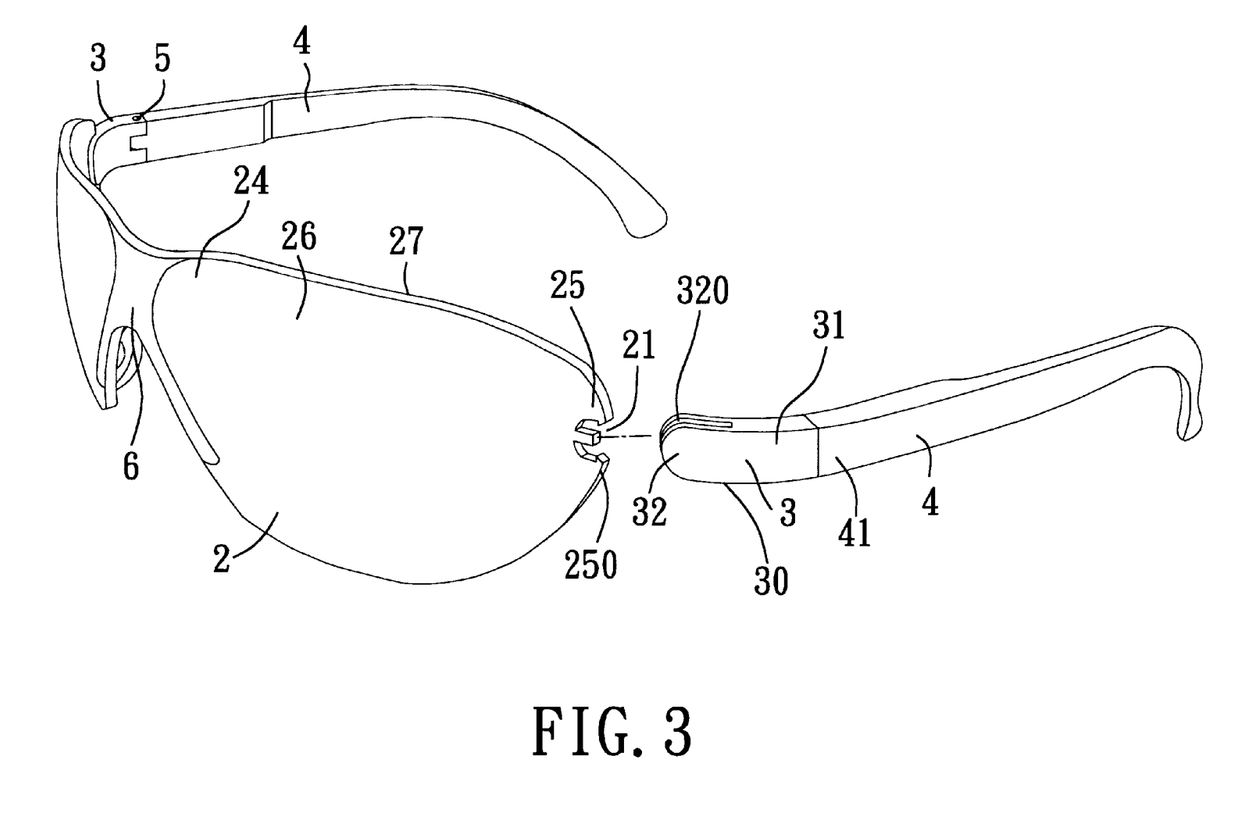
FIG. 3 is a partly exploded perspective view of the first preferred embodiment of a pair of eyeglasses according to this invention.
Figure 4:
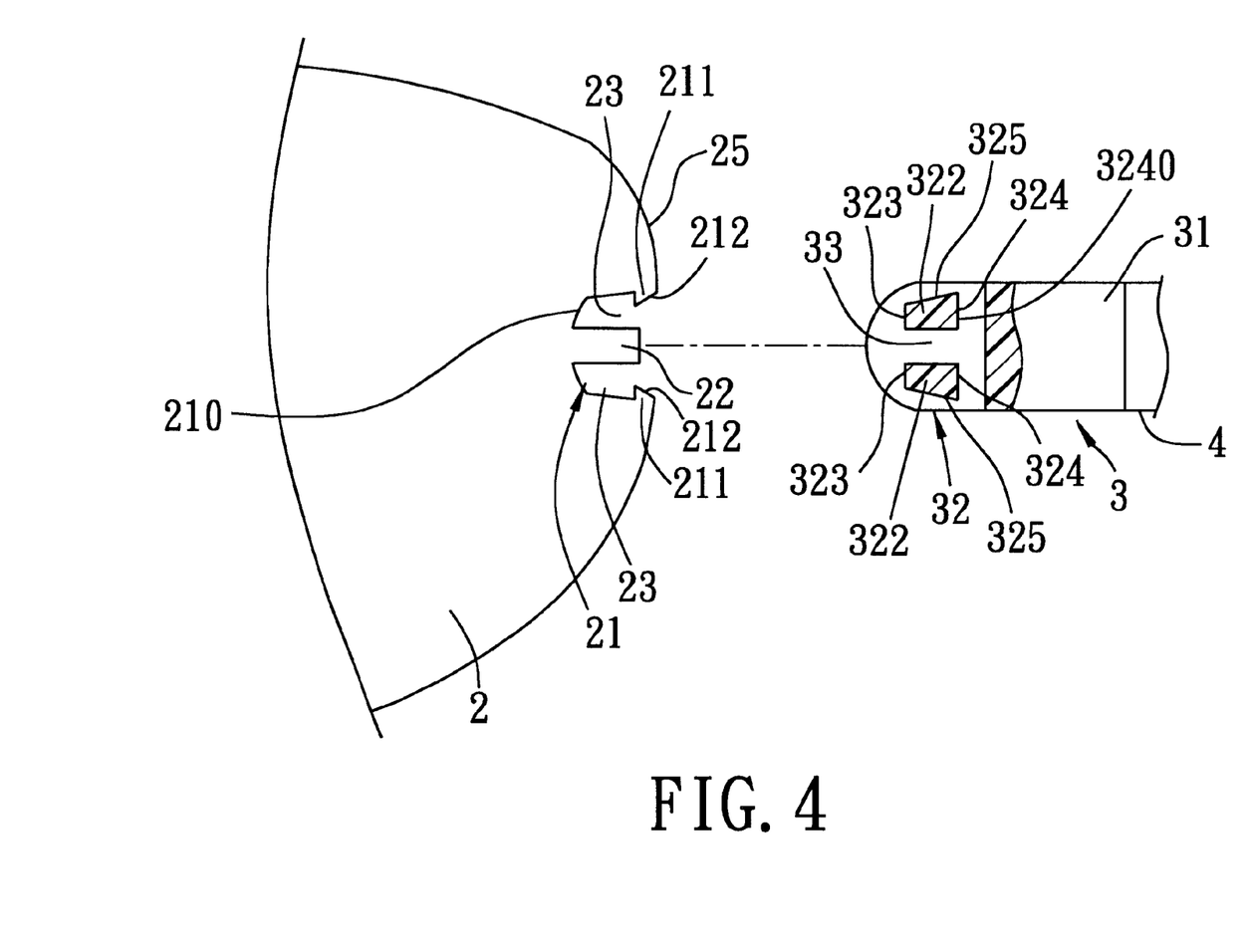
FIG. 4 is a fragmentary sectional view of a coupling member of the eyeglasses of FIG. 3 in a disassembled state.
Figure 5:
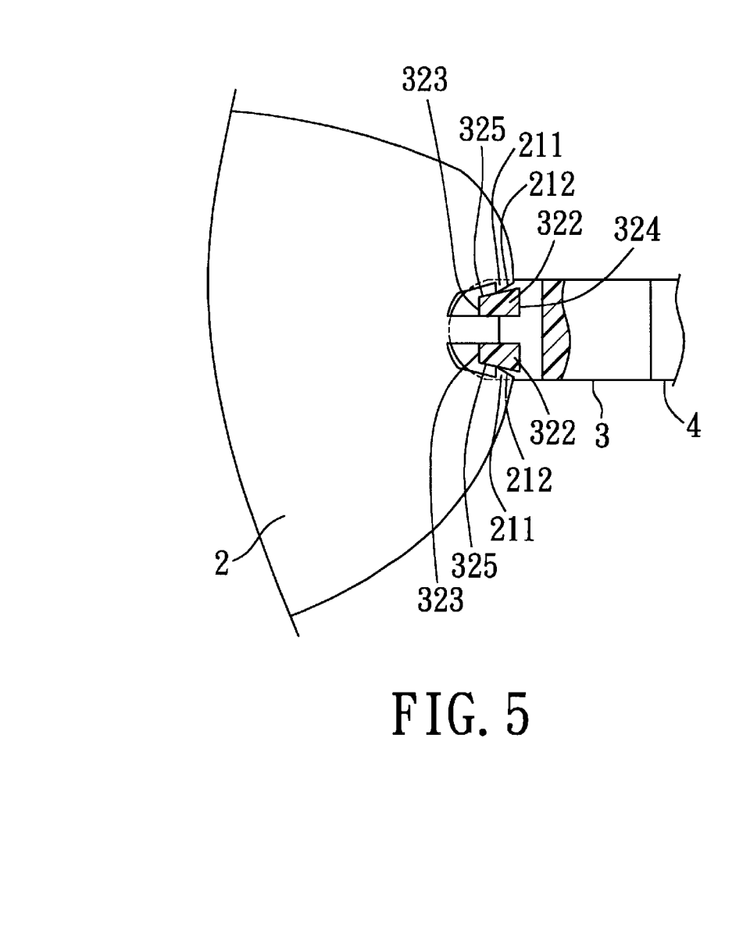
FIG. 5 is a fragmentary sectional view of the coupling member of FIG. 4 in an assembled state.
Figure 6:
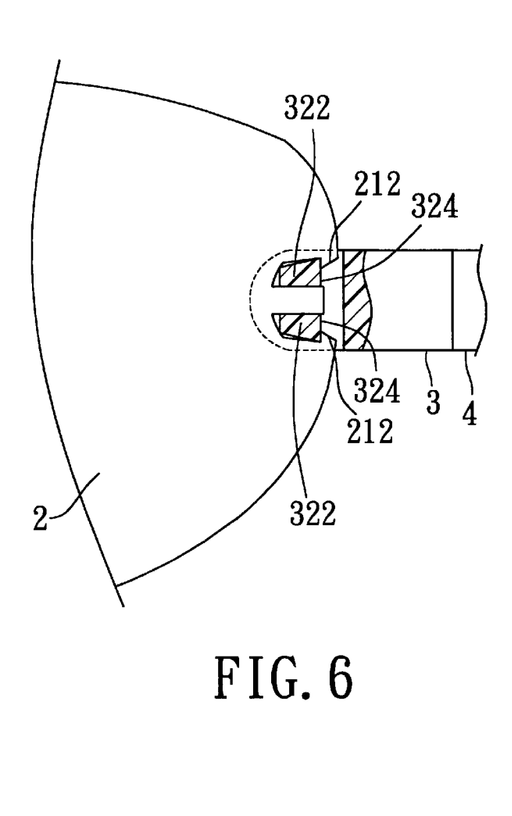
FIG. 6 is a fragmentary sectional view of the coupling member of FIG. 4 in an assembled state.
Figure 7:
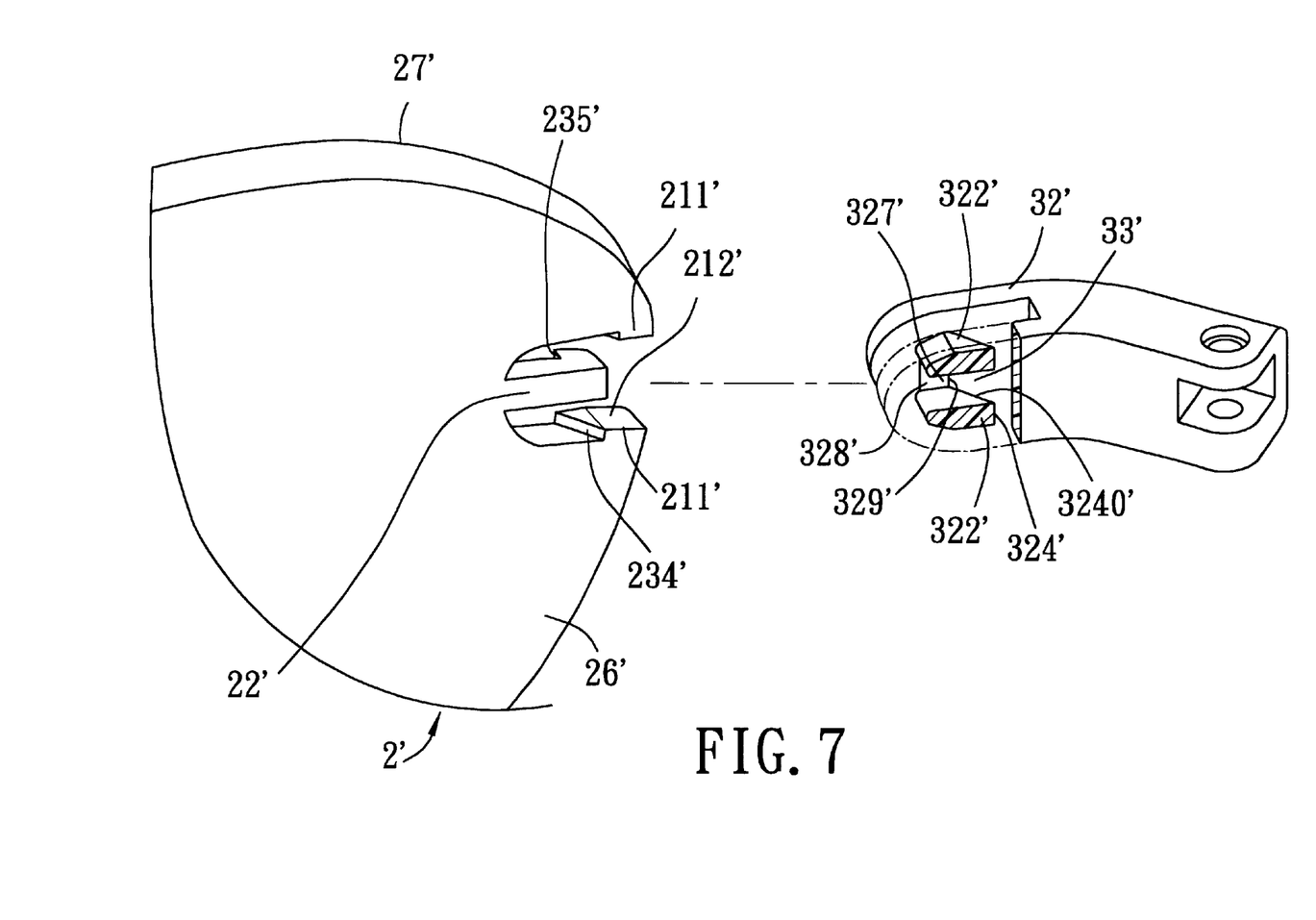
FIG. 7 is a fragmentary perspective sectional view of the second preferred embodiment of a pair of eyeglasses according to the present invention in a disassembled state.
Figure 8:
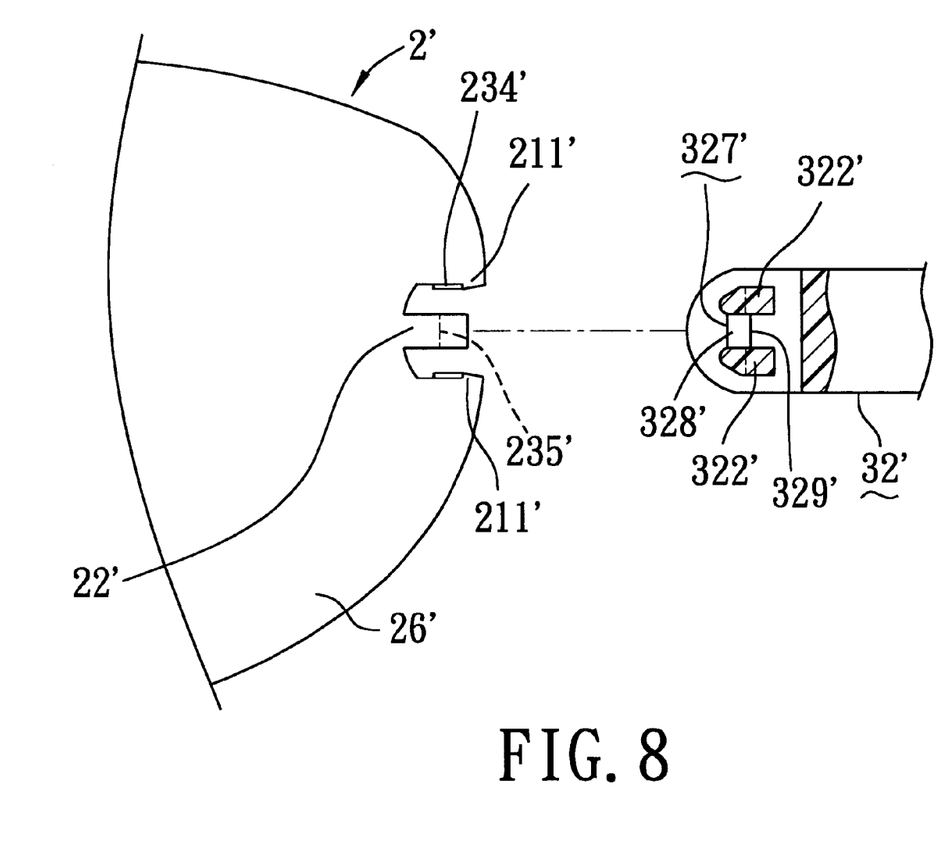
FIG. 8 is a fragmentary sectional side view of the eyeglasses of FIG. 7.
Figure 9:
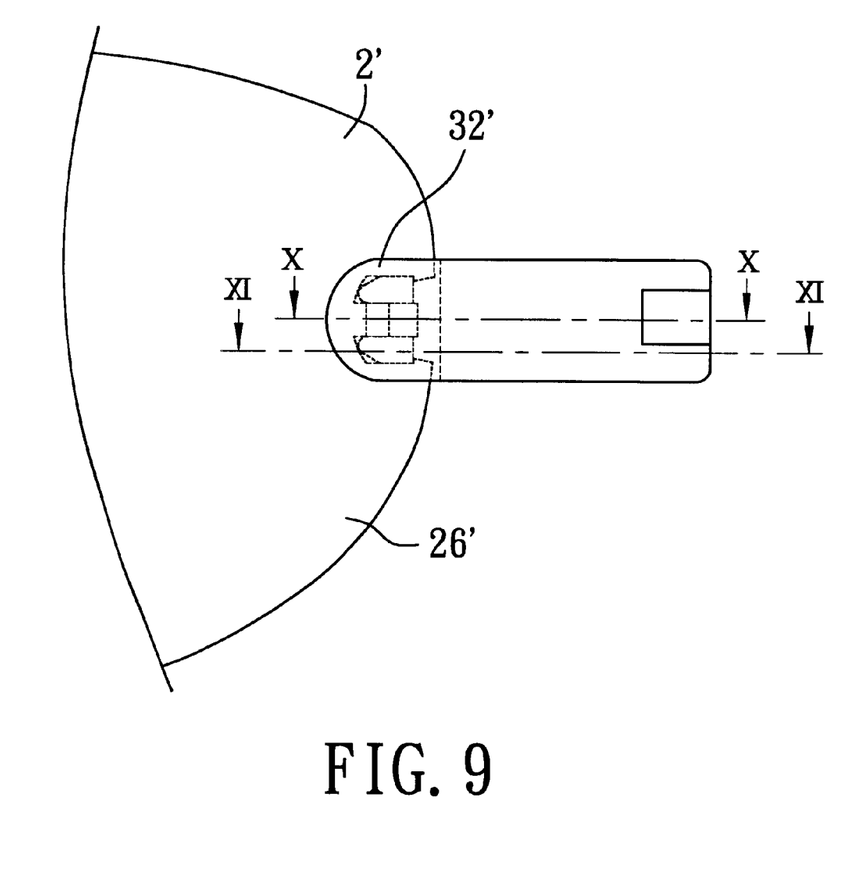
FIG. 9 is a fragmentary side view of the eyeglasses of FIG. 7 in an assembled state.
Figure 10:
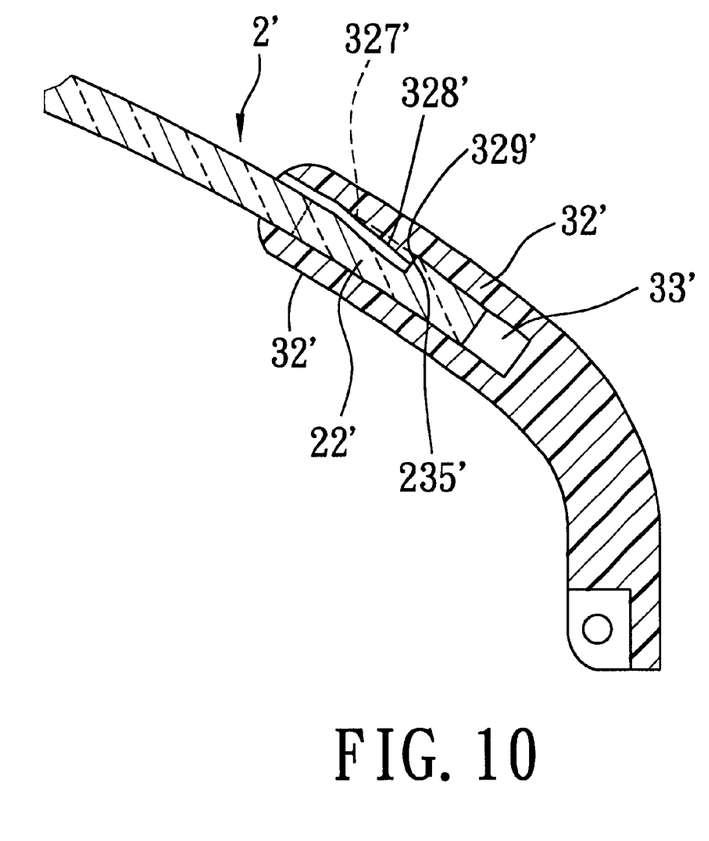
FIG. 10 is a fragmentary sectional view taken along lines X—X in FIG. 9.
Figure 11:
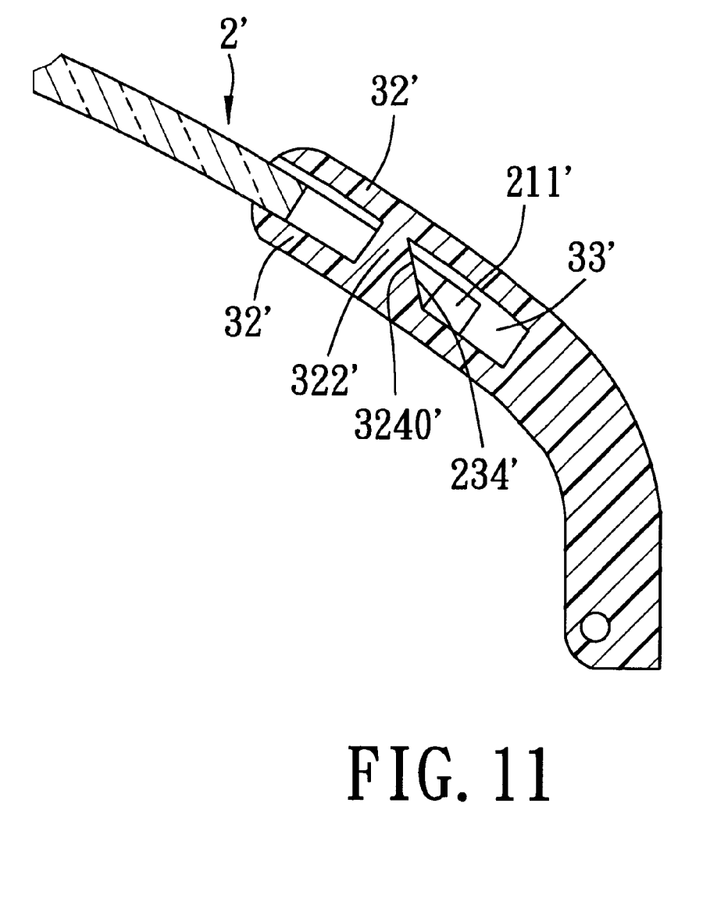
FIG. 11 is another fragmentary sectional view taken along lines XI—XI in FIG. 9.

FIGS. 1 and 2 illustrate a conventional pair of eyeglasses 1 that includes a pair of lenses 11, a pair of temples 13, and a pair of coupling members 12, each of which interconnects a respective lens 11 and a respective temple 13. Each coupling member 12 has an engaging end 121 that is indented to form a recess 120 which is defined by a recess-defining wall 123. The recess-defining wall 123 is curved, and has a base 124 and two opposite arms 122 that diverge outwardly from the base 124. The base 124 of the recess-defining wall 123 is formed with a plurality of alternately disposed first retaining grooves 126, first retaining tongues 125, and two opposite first barbs 127. Each lens 11 has a temple end 111 that is formed with a plurality of second retaining grooves 112, second retaining tongues 113, and two opposite second barbs 114 that are formed respectively on two outermost ones of the second retaining tongues 113 and that project in opposite directions away from each other. The retaining tongues 113 are elastic so as to permit engagement between the engaging end 121 of each coupling member 12 and the temple end 111 of the respective lens 11 in such a manner that the first retaining tongues 125 engage respectively the second retaining grooves 112, that the second retaining tongues 113 engage respectively the first retaining grooves 126, and that the first barbs 127 engage respectively the second barbs 114.

The aforesaid conventional eyeglasses 1 is disadvantageous in that since the second barbs 114 project away from each other, a larger recess 120 in the engaging end 121 of each coupling member 12 is required to accommodate the temple end 111 of the respective lens 11, which results in an increase in the profile of each coupling member 12.

SUMMARY OF THE INVENTION

Therefore, the object of the present invention is to provide a pair of eyeglasses that is capable of overcoming the aforementioned drawback of the prior art.

According to the present invention, there is provided a pair of eyeglasses that comprises: a pair of lenses, each of which has a nasal end, a temple end opposite to the nasal end, and opposite first and second faces, the temple end having an end face that extends transversely of the first and second faces to interconnect the first and second faces, and that is indented to form a recess which is defined by a recess-defining wall, the recess-defining wall having two opposite ends that are formed with two opposing barbs which project toward each other, and being formed with a first tongue that is disposed between the opposite ends, and that projects into the recess between the barbs, and that cooperates with each of the barbs to define a first gap therebetween; a bridge interconnecting the nasal ends of the lenses; a pair of temples, each of which has a pivot end; and a pair of coupling members, each of which has a pivot end pivoted to the pivot end of a respective one of the temples, a bifurcated end opposite to the pivot end and formed with a pair of parallel arms that project in a first transverse direction relative to the end face of the temple end of a respective one of the lenses, and that define an inner space therebetween, and a pair of opposing second tongues that are disposed within the inner space, that extend in a second transverse direction relative to the first and second faces and the first transverse direction to interconnect the arms, and that define a second gap therebetween. Each of the second tongues has a leading end and an engaging end that is opposite to the leading end and that is distal from the temple end, and extends in the first transverse direction from the engaging end to the leading end. The engaging end has an end face. Each of the second tongues is in snap engagement with a respective one of the barbs in such a manner that the first tongue is snugly fitted into the second gap, that each of the second tongues is fittingly inserted into the first gap between the first tongue and the respective one of the barbs, and that the end face of the engaging end of each of the second tongues abuts against the respective one of the barbs so as to prevent removal of the temples from the lenses.

BRIEF DESCRIPTION OF THE DRAWINGS

In drawings which illustrate embodiments of the invention.

DETAILED DESCRIPTION OF THE PREFERRED EMBODIMENTS

For the sake of brevity, like elements are denoted by the same reference numerals throughout the disclosure.

FIGS. 3 to 6 illustrate the first preferred embodiment of a pair of eyeglasses according to this invention. The eyeglasses includes: a pair of lenses 2, each of which has a nasal end 24, a temple end 25 opposite to the nasal end 24, and opposite first and second faces 26, 27, the temple end 25 having an end face 250 that extends transversely of the first and second faces 26, 27 to interconnect the first and second faces 26, 27, and that is indented to form a recess 21 which is defined by a recess-defining wall 210, the recess-defining wall 210 having two opposite ends that are formed with two opposing first barbs 211 which project toward each other, and being formed with a first tongue 22 that is disposed between the opposite ends, that projects into the recess 21 between the first barbs 211, and that cooperates with each of the first barbs 211 to define a first gap 23 therebetween; a bridge 6 interconnecting the nasal ends 24 of the lenses 2; a pair of temples 4, each of which has a pivot end 41; and a pair of coupling members 3, each of which has a pivot end 31 pivoted to the pivot end 41 of a respective one of the temples 4 through a pivot pin 5, a bifurcated end 30 opposite to the pivot end 31 and formed with a pair of parallel arms 32 that project in a first transverse direction relative to the end face 250 of the temple end 25 of a respective one of the lenses 2, and that define an inner space 320 therebetween, and a pair of opposing second tongues 322 that are disposed within the inner space 320, that extend in a second transverse direction relative to the first and second faces 26, 27 and the first transverse direction to interconnect the arms 32, and that define a second gap 33 therebetween. Each of the second tongues 322 has a leading end 323 and an engaging end 324 that is opposite to the leading end 323 and that is distal from the temple end 25, and extends in the first transverse direction from the engaging end 324 to the leading end 323. The engaging end 324 has an end face 3240. Each of the second tongues 322 is in snap engagement with a respective one of the first barbs 211 (see FIG. 6) in such a manner that the first tongue 22 is snugly fitted into the second gap 33, that each of the second tongues 322 is fittingly inserted into the first gap 23 between the first tongue 22 and the respective one of the first barbs 211, and that the end face 3240 of the engaging end 324 of each of the second tongues 322 abuts against the respective one of the first barbs 211 so as to prevent removal of the temples 4 from the lenses 2.

The first barbs 211 of the recess-defining wall 210 define a pair of opposing first guiding faces 212 that face toward each other and that diverge outwardly of the recess 21. The second tongues 322 of each of the coupling members 3 define a pair of opposite second guiding faces 325 that converge from the engaging ends 324 to the leading ends 323, that slide respectively over the first guiding faces 212 of the first barbs 211, and that push the opposite ends of the recess-defining wall 210 to move elastically away from each other during insertion of the second tongues 322 into the first gaps 23 (see FIG. 5) so as to permit snap engagement between each of the second tongues 322 and the respective one of the first barbs 211.

Since the first barbs 211 project toward each other, the spacing between the second engaging tongues 322 can be reduced, thereby eliminating the aforesaid drawback associated with the prior art.

FIGS. 7 to 11 illustrate a second preferred embodiment of the eyeglasses that is similar to the previous embodiment, except that the first guiding faces 212' of the first barbs 211' are substantially parallel to each other and extend in the second transverse direction, that each of the first barbs 211' further defines an engaging face 234' which is transverse to the first guiding faces 212', and which extends between and which is inclined relative to the first and second faces 26', 27' of a respective one of the lenses 2', that the first tongue 22' has a free end formed with a second barb 235' which projects toward one of the arms 32', that said one of the arms 32' is formed with a third barb 327' which is disposed between the second tongues 322' and which projects toward and which engages the second barb 235' in a snap engagement manner, and that the end face 3240' of the engaging end 324' of each of the second tongues 322' extends between and is inclined relative to the arms 32' and is complementary to and engages the engaging face 234' of a respective one of the first barbs 211'. The third barb 327' has a leading end and an engaging end 329' that is opposite to the leading end and that confronts and comes into contact with the second barb 235', and defines a guiding face 328' that extends inclinedly relative to said one of the arm 32' from the engaging end 329' to the leading end in a direction toward said one of the arms 32' so as to facilitate insertion of the first tongue 22' into the second gap 33'.

With the invention thus explained, it is apparent that various modifications and variations can be made without departing from the spirit of the present invention. It is therefore intended that the invention be limited only as recited in the appended claims.

I claim:

1. A pair of eyeglasses comprising:
    a pair of lenses, each of which has a nasal end, a temple end opposite to said nasal end, and opposite first and second faces, said temple end having an end face that extends transversely of said first and second faces to interconnect said first and second faces, and that is indented to form a recess which is defined by a recess-defining wall, said recess-defining wall having two opposite ends that are formed with two opposing first barbs which project toward each other, and being formed with a first tongue that is disposed between said opposite ends, that projects into said recess between said first barbs, and that cooperates with each of said first barbs to define a first gap therebetween;
    a bridge interconnecting said nasal ends of said lenses;
    a pair of temples, each of which has a pivot end; and
    a pair of coupling members, each of which has a pivot end pivoted to said pivot end of a respective one of said temples, a bifurcated end opposite to said pivot end and formed with a pair of parallel arms that project in a first transverse direction relative to said end face of said temple end of a respective one of said lenses, and that define an inner space therebetween, and a pair of opposing second tongues that are disposed within said inner space, that extend in a second transverse direction relative to said first and second faces and said first transverse direction to interconnect said arms, and that define a second gap therebetween, each of said second tongues having a leading end and an engaging end that is opposite to said leading end and that is distal from said temple end, and extending in said first transverse direction from said engaging end to said leading end, said engaging end having an end face, each of said second tongues being in snap engagement with a respective one of said first barbs in such a manner that said first tongue is snugly fitted into said second gap, that each of said second tongues is fittingly inserted into said first gap between said first tongue and the respective one of said first barbs, and that said end face of said engaging end of each of said second tongues abuts against the respective one of said first barbs so as to prevent removal of said temples from said lenses.

2. The eyeglasses of claim 1, wherein said first barbs of said recess-defining wall define a pair of opposing first guiding faces that face toward each other and that diverge outwardly of said recess, said second tongues of each of said coupling members defining a pair of opposite second guiding faces that converge from said engaging ends to said leading ends and that slide respectively over said first guiding faces of said first barbs so as to permit snap engagement between each of said second tongues and the respective one of said first barbs.

3. The eyeglasses of claim 1, wherein said first barbs of said recess-defining wall define a pair of opposing first guiding faces that face toward each other and that extend in said second transverse direction, each of said first barbs further defining an engaging face which is transverse to said first guiding faces and which extends between and which is inclined relative to said first and second faces, said first tongue having a free end formed with a second barb which projects toward one of said arms, said one of said arms being formed with a third barb which is disposed between said second tongues and which projects toward and which engages said second barb in a snap engagement manner, said end face of said engaging end of each of said second tongues extending between and being inclined relative to said arms, and being complementary to and engaging said engaging face of a respective one of said first barbs.

* * * * *